Dec. 15, 1964

R. H. SILL 3,161,532

THERMOPLASTIC POLYMERIC FILMS

Filed Aug. 17, 1962

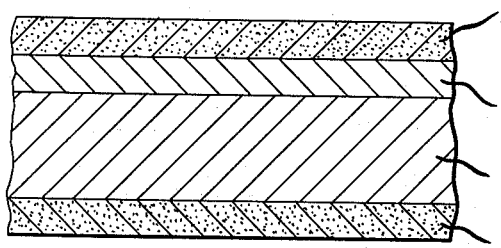

COPOLYMER OF 80-97% VINYLIDENE CHLORIDE AND 3-20% POLYMERIZABLE MONO-OLEFINIC MONOMER.

COPOLYMER OF UP TO 50% VINYLIDENE CHLORIDE, 40-90% ALKYL ACRYLATE AND 10-30% ACRYLONITRILE

THERMOPLASTIC POLYMERIC MATERIAL.

COPOLYMER OF 80-97% VINYLIDENE CHLORIDE AND 3-20% POLYMERIZABLE MONO-OLEFINIC MONOMER.

INVENTOR
RICHARD H. SILL

BY *Herbert M. Wolfson*

ATTORNEY

United States Patent Office 3,161,532
Patented Dec. 15, 1964

3,161,532
THERMOPLASTIC POLYMERIC FILMS
Richard H. Sill, Circleville, Ohio, assignor to E. I. du Pont de Nemours and Company, Wilmington, Del., a corporation of Delaware
Filed Aug. 17, 1962, Ser. No. 217,530
7 Claims. (Cl. 117—68)

This invention relates to the manufacture of themoplastic polymeric films such as films of polyethylene terephthalate. More particularly, it relates to the preparation of films suitable for conversion to bags, containers and similar packages.

The desired properties for transparent packaging films are well known. They include strength, heat-sealability, durability of the heat-seal as well as durability of the complete film, moistureproofness, low permeability to oxygen and carbon dioxide, high gloss, clarity, freedom from electrostatic charges and resistance to animal and vegetable fats and oils.

In the case of thermoplastic polymeric materials such as polyethylene terephthalate, strength is obtained by orienting the film in a stretching and/or rolling operation followed by heat-setting the film. Orienting, however, increases the degree of crystallinity and effects other microstructural changes which tend to impair some of the remaining properties of the film. For example, after orienting polyethylene terephthalate film, it is no longer possible to heat-seal the film with most conventional heat-sealing apparatus and obtain durable bonds. Attempting to heat-seal results in severe shinkage with attendant puckering and weakness at the seal.

Recognizing the above major obstacles to wider commercial use of thermoplastic polymeric films such as polyethylene terephthalate, the industry has proposed various remedies. These remedies take the form of coatings or other treatments which tend to improve some of the properties but at the expense of other properties. Furthermore, coatings that improve the heat-sealability of oriented polyethylene terephthalate film tend to become collected on the jaws of the heat-sealing apparatus of the package-making machine causing periodic shut-downs of the machine for cleaning.

A thermoplastic polymeric film possessing the optimum requirements for use in preparing commercial packaging has remained an elusive goal.

The object of the present invention is to provide a novel thermoplastic polymeric film fulfilling the requirements of a packaging material, i.e., strength, durability, heat-sealability without adversely affecting commercial packaging machines, moistureproofness, low permeability to gases, etc. Another object is to specify a process for preparing the novel thermoplastic polymeric films, particularly films of polyethylene terephthalate. Other objects will appear hereinafter.

These objects are accomplished by providing a base film of thermoplastic polymeric material having one surface coated with two special coatings:

(A) A subcoating comprising a copolymer obtained by polymerizing up to 50% vinylidene chloride, 40–90% of an alkyl acrylate wherein the alkyl group contains at least two carbon atoms and 10–30% acrylonitrile.

(B) A top coating comprising a copolymer obtained by polymerizing from 80–97% vinylidene chloride and 3–20% of at least one other polymerizable mono-olefinic monomer copolymerizable therewith, preferably an alkyl acrylate;

And one surface coated only with coating (B).

Preferably, the subcoating, coating (A), comprises a copolymer obtained from 60–90° of an alkyl acrylate, 10–30% of acrylonitrile and 0.5–3% by weight, based upon the total weight of the previous two components, of an unsaturated aliphatic acid from the group consisting of acrylic, methacrylic, and itaconic acids, and the top coating, coating (B), comprises a copolymer obtained from 90–97% vinylidene chloride, 3–10% of an alkyl acrylate, and 0.5–3% by weight, based upon the total weight of the previous two components, of an unsaturated aliphatic acid from the group consisting of acrylic, methacrylic and itaconic acids, 1.0–2.5% by weight of carnauba wax, 0.5–2.5% by weight of a dispersing agent for the wax and 0.3–1% by weight of particulate polyvinyl chloride, the percentages of unsaturated aliphatic acid, wax, dispersant for wax and polyvinyl chloride, all based upon the total weight of vinylidene chloride and alkyl acrylate.

The inventon will be more clearly understood by referring to the following examples. These examples, although illustrating specific embodiments of the present invention, should not be considered limitative.

In the examples, the components used for preparing the copolymers are given in weight percentages. The percentages of itaconic acid are based on the total weight of the major components. Thus, a copolymer from 80% 2-ethylhexyl acrylate, 20% acrylonitrile and 2% itaconic acid may be prepared from 80 pounds of 2-ethylhexyl acrylate, 20 pounds of acrylonitrile and 2 pounds of itaconic acid.

EXAMPLES 1–8

The films were prepared in the following manner. A base film of polyethylene terephthalate, 0.5 mil thick, stretched 3 times its original dimensions in two directions and heat-set at about 200° C. while under tension, was coated on one surface with the two special coatings. The subcoating, coating (A), contained a copolymer of 80% 2-ethylhexyl acrylate, 20% acrylonitrile and 2%, based on the total weight of the previous components, of itaconic acid and was prepared from the following charge:

| | Parts |
|---|---|
| Water | 172 |
| "Duponol" ME | 2 |
| 2-ethylhexyl acrylate | 80 |
| Acrylonitrile | 20 |
| Itaconic acid | 2 |

"Duponol" ME,[1] 2-ethylhexyl acrylate, acrylonitrile, itaconic acid and water were added to a vessel fitted with a stirrer and reflux condenser. A stream of nitrogen was bubbled through the mixture for 10 minutes, and then the reaction vessel was sealed and the contents stirred and heated to 50° C. Ammonium persulfate and sodium meta-bisulfite were added in three separate portions in the following amounts, with each portion being added after cessation of reaction from the previous addition:

First addition:
  0.1 part ammonium persulfate
  0.0115 part sodium meta-bisulfite
  1.2 parts water
Second addition:
  0.02 part sodium meta-bisulfite
  0.75 part water
Third addition:
  0.1 part ammonium persulfate
  0.0538 part sodium meta-bisulfite
  1.5 parts water The ammonium persulfate and sodium meta-bisulfite were added in this step-wise manner to provide easier temperature control during the exothermic reaction. Heating and stirring were continued for 1 hour after the final addition of the above materials, and then a solution of two pounds of "Sulframin" AB [2] in 12.7 parts of water

[1] Sodium lauryl sulfate.
[2] Sodium salt of an alkyl benzene sulfonate.

was added as a sizing and stabilizing agent An aqueous 28% ammonium hydroxide solution (2.48 parts) was also added to maintain the pH of the mixture above 8. The dispersion was cooled to 30° C. and discharged through a filter. The polymer dispersion contained 35.5% solids. A 0.125% solution in dimethyl formamide of the coagulated and washed polymer had an inherent viscosity of 0.9 at 125° C.

The topcoating, coating (B), contained a copolymer of 94% vinylidene chloride, 6% methyl acrylate and 2%, based on the total weight of the previous two components, of itaconic acid and was prepared from the following charge:

|  | Parts |
|---|---|
| Water | 136.5 |
| "Duponol" ME | 2 |
| Ammonium persulfate | 0.15 |
| Vinylidene chloride | 94 |
| Methyl acrylate | 6 |
| Itaconic acid | 2 |
| Meta-sodium bisulfite | 0.075 |

"Duponol" ME, ammonium persulfate, itaconic acid and water were added to a vessel fitted with a stirrer and a reflux condenser. After dissolving these components by stirring, vinylidene chloride and methyl acrylate were introduced and the mixture refluxed at 32° C. A solution of meta-sodium bisulfite was added and the mixture stirred until refluxing ceased, thereby indicating completion of polymerization.

Subsequent to polymerization, 2% "Duponol" WAQE,[3] 1% hydrogen peroxide, 0.4% particulate polyvinyl chloride, a water emulsion of carnauba wax and a dispersing agent for the carnauba wax, "Duponol" ME—100% active, was added to the coating dispersion. The hydrogen peroxide is utilized as a corrosion inhibitor; the "Duponol" WAQE, as a stabilizer and wetting agent. The particulate polyvinyl chloride provides good slip and also enhances the packaging machine runnability of the ultimate coated film.

The carnauba wax dispersion was prepared by first melting the wax, adding the dispersing agent, and then adding hot water (above the melting point of wax) directly and slowly to the molten wax-emulsifier mixture with stirring. A water-oil emulsion is first formed which is inverted to the desired oil-water emulsion by further addition of hot water. After inversion to an oil-water emulsion, the remainder of the water can be added cool and at a faster rate. This inversion method for preparing the wax emulsion has been found to be very effective for obtaining small particle size emulsions. Small particle size insures low haze level and good appearance in the final coated film. The optical density of the wax emulsion, as determined by measuring a 0.025 gram wax/100 mil dispersion at 546 mu in a 1 centimeter cell in a Beckman DU Spectrophotometer, should be less than 0.6 for low haze and good appearance properties.

The polyethylene terephthalate base films were subcoated with the subcoating dispersion, coating (A), on one side only utilizing a kiss-coating process such as described in U.S. Patent 2,933,417. After coating (A) was applied, the films were dried in the drying tower. The aqueous dispersion of the top coating, coating (B), was then applied on both sides of the film by passing the films through baths of the top coating dispersion. Excess dispersion was removed by doctoring as the coating was made smooth and brought to the desired thickness. The top coated films were then dried in a drying tower.

The weight of the subcoating varied, as shown in Table I, from 4.6 to 8.0 grams/square meter. The weight of the top coating was the same on both sides of the film and ranged from 3.5 to 4.6 grams/square meter. The particulate polyvinyl chloride represented 0.4% of the top coating and the carnauba wax represented 2.25% (in Examples 1–5) and 2.0% (in Examples 6–8) of the top coating, all percentages based on the weight of the monomers.

The amount of heat applied in the drying tower is important to limit wrinkles and to provide the desired slip and heat-seal strength in the ultimate film. The heat input to the film in the drying tower is reflected in the shrinkage of the film in the direction of its width. These shrinkages are given in Table I. They should be maintained between about 2.5% and 6% when drying the subcoating and between 0.8 and 5.0% when drying the top coating.

The resulting films displayed excellent heat-seal strengths, fine surface properties and outstanding ability to be formed into packages on a conventional "make and fill" packaging machine. The specific results are presented in Table I.

*Table I*

| Example | Subcoating Weight, gms./sq. met. | Top Coating Weight, gms./sq. met. | Percent Shrinkage During Drying | | Heat-Seal Strength, gms./1.5" |
|---|---|---|---|---|---|
| | | | Subcoat | Top Coat | |
| 1 | 7.5 | 3.75 | 3.3 | 1.7 | 997 |
| 2 | 5.3 | 4.6 | 2.9 | 1.7 | 956 |
| 3 | 7.3 | 3.5 | 3.3 | 2.5 | 983 |
| 4 | 4.6 | 4.0 | 2.5 | 2.1 | 973 |
| 5 | 8.0 | 3.7 | 3.3 | 1.7 | 1,020 |
| 6 | 7.3 | 4.4 | 4.0 | 3.3 | 1,011 |
| 7 | 6.0 | 3.7 | 3.3 | 1.9 | 931 |
| 8 | 7.2 | 3.5 | 3.5 | 1.7 | 967 |

The details of the methods for testing the films follow:

Coating weight is determined by first dissolving the coating from the single coated side with cyclohexanone. After rinsing the film with ethyl acetate, the film is weighed to yield the top coating weight. The film is then immersed in cyclohexanone. The double coating on the opposite side dissolves. After rinsing in ethyl acetate and drying the film, the film is weighed again to yield the weight of the double coating. By subtracting the top coating weight from the weight of the double coating, the subcoating weight is obtained.

Heat-seal strength is measured by folding a piece of the film so that the subcoating is facing itself. The film is then sealed with a flat bar precision heat sealer having ¾" jaws heated to 160° C. Sealing time is 2 seconds with a 20 p.s.i. jaw pressure. A 1½" by 4" sample is cut from the sealed film so that the 1½" wide sealed section is across one end of the sample. The seal strength is then determined by placing the free ends of the sample in a Suter Testing Machine and reading the maximum force in grams required to pull the seal apart. A minimum of 750 grams/1.5 inches is necessary for heavy duty packages.

Film shrinkage is determined manually by measuring the width of the coated film before and after it is passed through the drying tower.

Slip is measured manually after 24 hours aging at room temperature and rated according to the following standards:

Excellent to good (high pressure slip)—no amount of pressure exerted on two film surfaces held together between thumb and forefinger is sufficient to prevent two surfaces from slipping over each other under tangential force.

Fair to poor (low pressure slip)—two film surfaces will slide past each other only when moderate pressure is exerted normal to the film surfaces.

Inoperable (no slip)—no matter how lightly two film surfaces are held together, they will not slip past each other under tangential force.

---

[3] "Duponol" WAQE—sodium lauryl sulfate—33% active.

Blocking is determined using the method of MRTM No. 2123 with ratings given according to the following scheme:

Excellent—individual sheet separate from the pile with little shear stress exerted between the thumb and forefinger.
Good—individual sheets and small groups separate with some resistance.
Fair—only large groups separate with considerable resistance to thumb and forefinger.
Poor—separation of pile can only be brought about by shear stress exerted between palms of hands.
Inoperable—separation of pile can only be effected by peeling off sheets.

Blush (haziness), pattern (alternate hazy and clear lanes running in the lengthwise direction), and streaks (coating striations) are determined by visual observation. There were virtually eliminated by the present invention.

Machine runnability: The films are tested on a "Compak" make-and-fill packaging machine.[4] A make-and-fill machine is operated by making a few empty bags to check sealing before the product feed is turned on. If the empty bags do not feed free and fall, the machine will jam. Also if the film sticks to the sealing jaws harder than it sticks in the freshly made seal, the jaws will peel the seal apart on the return cycle.

In other experiments, the details of which are not shown, it was found that the surface properties, e.g., slip, block and machine runnability, were much improved by the presence of the carnauba wax and the particulate polyvinyl chloride in the top coating. The concentration of carnauba wax in the top coating dispersion may range from 1.0% to 2.5% and the concentration of particular polyvinyl chloride may range from 0.3% to 1%, both percentages based on the weight of the polymerizable monomers.

As dispersing agent for the carnauba wax, alkali metal salts of fatty alcohol sulfates, e.g., sodium lauryl sulfate, are preferred. However, any of the known dispersing agents may be used. Among those which tested successfully are: alkyl phenoxy polyoxyethylene ethanol, polyoxyethylated fatty alcohol, polyoxyethylene sorbitan monooleate, sorbitan monooleate, condensate of oleyl alcohol plus 20 moles ethylene oxide, condensate of oleyl alcohol plus 15 moles ethylene oxide, polyoxyethylated vegetable oil and dispersion of carnauba wax in sodium lauryl sulfate with minor amounts of stearic acid, oleic acid or sorbitan monostearate.

It was also found that machine runnability deteriorated when the two coatings were applied to both sides of the polyethylene terephthalate film. When a subcoating and a top coating were applied to one side only, it was found that the heat-seal strength of the coated side to an uncoated side (the side seals of packages) fell to substantially zero after the films were sealed and stored for relatively short periods of time. When side sealing the films of this invention, a double coated side to a top coated side, the heat-seal strength did not suffer after short storage periods.

While the examples refer to coating polyethylene terephthalate films, the invention is applicable to thermoplastic polymeric films in general. The invention is applicable to these films whether the films are stretched and heat-set, stretched only or neither stretched nor heat-set.

The important concept leading to the wrapping materials described in the examples and the materials described in the preceding paragraphs resides in the use of a base film of thermoplastic polymeric material coated on one surface with two critical coatings; namely a subcoating comprising a copolymer obtained from up to 50% by weight of vinylidene chloride, 40–90% by weight of an alkyl acrylate and 10–30% acrylonitrile, and a top coating comprising a copolymer obtained from 80–97% vinylidene chloride and 3–20% of at least one other polymerizable mono-olefinic monomer copolymerizable with vinylidene chloride and coated on the other surface with one coating; namely a copolymer obtained from 80–97% vinylidene chloride and 3–20% of at least one other polymerizable mono-olefinic monomer copolymerizable with vinylidene chloride.

The alkyl acrylate in the subcoating contributes to the elasticity and the heat-seal strength of the film. The amount of this component necessary to provide a packaging material of satisfactory strength and durability is dependent upon the particular alkyl acrylate used. Acrylonitrile in the subcoating contributes to the resistance of the copolymer to degradation by animal and vegetable oils and fats. Without acrylonitrile, the subcoating composition is either swollen or dissolved by many types of animal or vegetable oils or fats.

The moisture impermeability of the film of this invention is contributed by the top coating composition. A relatively hard polymer prepared from at least 80% vinylidene chloride and 3–20% of at least one other polymerizable mono-olefinic monomer is necessary. Such polymers are not easily affected by animal or vegetable oils. As polymerizable monomers for use with the vinylidene chloride in the top coating, I have illustrated the use of methyl acrylate. However, the invention is not so limited. Other polymerizable monomers may also be used. The list includes: methyl, ethyl, isobutyl, butyl, octyl and 2-ethylhexyl acrylates and methacrylates; phenyl methacrylate, cyclohexyl methacrylate, p-cyclohexylphenyl methacrylate, methoxyethyl methacrylate, chloroethyl methacrylate, 2-nitro-2-methyl-propyl methacrylate, and the corresponding esters of acrylic acid, methyl alpha-chloroacrylate, octyl alpha-chloroacrylate, methyl isopropenyl ketone, acrylonitrile, methacrylonitrile, methyl vinyl ketone, vinyl chloride, vinyl acetate, vinyl propionate, vinyl chloroacetate, vinyl bromide, styrene, vinyl naphthalene, ethyl vinyl ether, N-vinyl phthalimide, N-vinyl succinimide, N-vinyl carbazole, isopropenyl acetate, acrylamide, methacrylamide or monoalkyl substitution products thereof, phenyl vinyl ketone, diethyl fumarate, diethyl maleate, methylene diethyl malonate, dichlorovinylidene fluoride, dimethyl itaconate, diethyl itaconate, dibutyl itaconate, vinyl pyridine, maleic anhydride, allyl glycidyl ether and other unsaturated aliphatic ethers described in U.S. Patent 2,160,943. These compounds may be described as vinyl or vinylidene compounds having a single

group. The most useful ones fall within the general formula

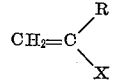

where R may be hydrogen, a halogen or a saturated aliphatic radical and X is selected from one of the following groups: —Cl, —Br, —F, —CN, —C$_6$H$_5$, —COOH,

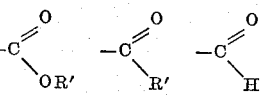

—OC$_6$H$_5$, —CONH$_2$, —CONH—R', and —CONR'$_2$, in which R' is alkyl.

The coatings may be applied from aqueous or organic vehicles, i.e., in the form of aqueous dispersions or from solutions of the polymers in organic solvents. For optimum properties, unsaturated aliphatic acids such as itaconic acid, acrylic acid and methacrylic acid may be incorporated in the coating compositions. While the

---

[4] "Compak" make-and-fill machines—manufactured by Hayssen Mfg. Co., Sheyboygan, Wisconsin.

examples illustrate the use of itaconic acid in the coating compositions, substantially equivalent quantities of either acrylic acid or methacrylic acid used in place of itaconic acid produce similar results. When the top coating compositions are applied from organic solutions, the acid may be omitted with little deleterious effect. When coating from aqueous dispersions, the acid may also be omitted if steps are taken to facilitate wetting the film by using commercial wetting agents or other methods. It should be pointed out that films top coated with compositions that do not include the unsaturated aliphatic acids are somewhat inferior in the degree of transparency. For this reason, it is preferred to include one of the above unsaturated aliphatic acids in the top coating compositions.

The coatings may be applied in accordance with any known coating techniques. They may be applied by passing the film through baths in a continuous manner or in a batch manner. Coatings may also be sprayed on the film, or applied manually by brushing or the like. The thickness of the coatings may be adjusted in accordance with methods well known in the coating art. A subcoating thickness of at least 4.5 grams/square meter on one side of the film has been found necessary and a top coating thickness of at least 3 grams/square meter on each side has been found desirable.

The films of this invention are useful as packaging materials for foods, cigarettes and the like, particularly for high bulk density materials such as dried fruits, candy, shelled nuts, coffee and freeze-dried vegetables. Their durability, their strength at the heat-seals and their impermeability to gases and water vapor combine to provide wrapping materials that can withstand the abuse of handling and shipping and wherein the freshness of the products may be retained over long periods.

While the invention contemplates the use of the copolymers as the essential constituents of the coatings, other ingredients may be added. The addition of pigments, dyes, delustrants, plasticizers, etc., is therefore understood to be within the purview of this invention.

As many widely different embodiments may be made without departing from the spirit and scope of this invention, it is understood that the invention is not limited except as defined in the appended claims.

What is claimed is:

1. A base film of thermoplastic polymeric material having one surface coated with a subcoating having a thickness of at least 4.5 grams per square meter and comprising a copolymer obtained from up to 50% vinylidene chloride, 40–90% alkyl acrylate and 10–30% acrylonitrile and a top coating comprising a copolymer obtained from 80–97% vinylidene chloride and 3–20% of at least one other polymerizable mono-olefinic monomer copolymerizable therewith and the opposite surface coated directly with a copolymer obtained from 80–97% vinylidene choloride and 3–20% of at least one other polymerizable mono-olefinic monomer copolymerizable therewith.

2. A base film of polyethylene terephthalate having one surface coated with a subcoating having a thickness of at least 4.5 grams per square meter and comprising a copolymer obtained from up to 50% vinylidene chloride, 40–90% alkyl acrylate and 10–30% acrylonitrile and a top coating comprising a copolymer obtained from 80–97% vinylidene chloride and 3–20% of at least one other polymerizable mono-olefinic monomer copolymerizable therewith and the opposite surface coated directly with a copolymer obtained from 80–97% vinylidene chloride and 3–20% of at least one other polymerizable mono-olefinic monomer copolymerizable therewith.

3. A film as in claim 2 wherein the mono-olefinic monomer copolymerizable with vinylidene chloride in the coatings is methyl acrylate.

4. A film as in claim 2 wherein the alkyl acrylate in the subcoating is 2-ethylhexyl acrylate.

5. A base film of thermoplastic polymeric material having one surface coated with a subcoating having a thickness of at least 4.5 grams per square meter and comprising a copolymer obtained from 60–90% alkyl acrylate, 10–30% acrylonitrile and 0.5–3%, based on the total weight of the previous components, of an unsaturated aliphatic acid from the group consisting of acrylic acid, methacrylic acid and itaconic acid and a top coating comprising a copolymer obtained from 90–97% vinylidene chloride, 3–10% alkyl acrylate and 0.5–3% of an unsaturated aliphatic acid from the group consisting of acrylic acid, methacrylic acid and itaconic acid, 1.0–2.5% by weight of carnauba wax, 0.5–2.5% by weight of a dispersing agent for the wax and 0.3–1% by weight of particulate polyvinyl chloride, the percentages of unsaturated aliphatic acid, wax, dispersant for wax and polyvinyl chloride, all based upon the total weight of vinylidene chloride and alkyl acrylate; and the opposite surface coated directly with a copolymer obtained from 90–97% vinylidene chloride, 3–10% alkyl acrylate and 0.5–3% of an unsaturated aliphatic acid from the group consisting of acrylic acid, methacrylic acid and itaconic acid, 1.0–2.5% by weight of carnauba wax, 0.5–2.5% by weight of a dispersing agent for the wax and 0.3–1% by weight of particulate polyvinyl chloride, the percentages of unsaturated aliphatic acid, wax, dispersant for wax and polyvinyl chloride, all based upon the total weight of vinylidene chloride and alkyl acrylate.

6. A film as in claim 5 wherein the unsaturated aliphatic acid in the coatings is itaconic acid.

7. A base film of polyethylene terephthalate having one surface coated with a subcoating having a thickness of at least 4.5 grams per square meter and comprising a copolymer obtained from up to 50% vinylidene chloride, 40–90% alkyl acrylate wherein the alkyl group contains at least two carbon atoms, 10–30% acrylonitrile and 0.5–3%, based on the total weight of the previous components, of an unsaturated aliphatic acid from the group consisting of acrylic acid, methacrylic acid and itaconic acid and a top coating comprising a copolymer obtained from 80–97% vinylidene chloride, 3–20% alkyl acrylate and 0.5–3% of an unsaturated aliphatic acid from the group consisting of acrylic acid, methacrylic acid and itaconic acid, 1.0–2.5% by weight of carnauba wax, 0.5–2.5% by weight of a dispersing agent for the wax and 0.3–1% by weight of particulate polyvinyl chloride, the percentages of unsaturated aliphatic acid, wax, dispersant for wax and polyvinyl chloride, all based upon the total weight of vinylidene chloride and alkyl acrylate; and the opposite surface coated directly with a copolymer obtained from 80–97% vinylidene, 3–20% alkyl acrylate and 0.5–3% of an unsaturated aliphatic acid from the group consisting of acrylic acid, methacrylic acid and itaconic acid, 1.0–2.5% by weight of carnauba wax, 0.5–2.5% by weight of a dispersing agent for the wax and 0.3–1% by weight of particulate polyvinyl chloride, the percentages of unsaturated aliphatic acid, wax, dispersant for wax and polyvinyl chloride, all based upon the total weight of vinylidene chloride and alkyl acrylate.

References Cited in the file of this patent

UNITED STATES PATENTS

| | | |
|---|---|---|
| 2,824,019 | Sapper | Feb. 18, 1958 |
| 2,824,025 | McIntyre | Feb. 18, 1958 |
| 2,909,443 | Wolinski | Oct. 20, 1959 |
| 3,041,208 | Hay et al. | June 26, 1962 |

UNITED STATES PATENT OFFICE
CERTIFICATE OF CORRECTION

Patent No. 3,161,532 December 15, 1964

Richard H. Sill

It is hereby certified that error appears in the above numbered patent requiring correction and that the said Letters Patent should read as corrected below.

Column 8, line 55, after "vinylidene" insert -- chloride --.

Signed and sealed this 20th day of April 1965.

(SEAL)
Attest:

ERNEST W. SWIDER
Attesting Officer

EDWARD J. BRENNER
Commissioner of Patents